United States Patent [19]

Hori

[11] 4,105,816

[45] Aug. 8, 1978

[54] DECORATIVE RELIEF FINISH PROCESS

[75] Inventor: Kiyoshi Hori, Suita, Japan

[73] Assignee: Nippon Paint Co., Ltd., Osaka, Japan

[21] Appl. No.: 580,342

[22] Filed: May 23, 1975

[30] Foreign Application Priority Data

Jan. 17, 1975 [JP] Japan .................................. 50-8145

[51] Int. Cl.[2] .......................... B32B 3/30; B05D 3/12; B05D 5/02

[52] U.S. Cl. .................................... 428/159; 264/293; 427/260; 427/262; 427/264; 427/267; 427/270; 427/274; 427/278; 427/280; 427/359; 427/428; 427/429; 428/160; 428/161; 428/172; 428/195; 428/201; 428/209

[58] Field of Search ............... 427/278, 270, 359, 271, 427/274, 260, 262, 264, 267, 428, 429, 256, 265, 280, 287; 29/121.1-121.8, 131, 132; 106/2; 118/212, 264, DIG. 15; 428/35, 156, 158-160, 195, 201, 206-209, 161, 172; 264/293

[56] References Cited

U.S. PATENT DOCUMENTS

| | | | |
|---|---|---|---|
| 269,144 | 12/1882 | West | 427/278 |
| 1,347,028 | 7/1920 | Gstalder | 427/278 |
| 1,436,155 | 11/1922 | Domy | 101/376 |
| 1,741,698 | 12/1929 | Hampson | 427/278 |
| 1,991,996 | 2/1935 | Bakker | 427/270 |
| 3,853,577 | 12/1974 | Nishida et al. | 427/278 |
| 3,877,958 | 4/1975 | Ishii | 427/270 |

*Primary Examiner*—George F. Lesmes
*Assistant Examiner*—Bruce H. Hess
*Attorney, Agent, or Firm*—Wenderoth, Lind & Ponack

[57] ABSTRACT

A decorative relief finished surface is formed by applying to the surface of an object or substrate to be patterned an undercoat coating material to a predetermined thickness, and forming an uneven pattern having a variety of projections on coated surface a plurality of times with a rolling device having a plurality of convex parts of curved continued, disconnected or perforated line shape which are formed in a random manner, with the intervals between the convex parts being substantially equal to each other, or by spraying coating material with a spray gun so as to form a multiplicity of projections of varying height. Then, the top portions of the projections of the partially hardened surface which extend beyond a predetermined height are pressed with a pressing roll, such that the projections are uniformly flattened to a predetermined thickness while the rest of the convex parts are left unflattened. The pressing roll is made of a hard or semi-hard, air-permeable, porous material.

29 Claims, 9 Drawing Figures

DECORATIVE RELIEF FINISH PROCESS

BACKGROUND OF THE INVENTION

The present invention relates to a decorative relief finish process. More particularly, it relates to a method of uniformly flattening or press-leveling excessive projections on the irregularly or unevenly roughened surface of an undercoat to a desired thickness to form a relief finish surface of desired decorative appearance.

Hitherto, decorative relief coatings having an irregularly or unevenly roughened surface have been formed by applying to a substrate such as a wall, for example, a spraying material or a coating material consisting mainly of coating composition, cement or plaster with a spray gun or a coating roller. These materials are used for undercoats as either primers of intermediate coating materials or as surfacers. The coated surface is ordinarily covered with a finishing topcoat. However, since these undercoats have irregular or uneven surfaces, it is customary to sand or polish or press excessive projections on the surface to level the thickness of the projections, thereby providing a more decorative topcoating or improving other functions of the uneven pattern, for example, to reduce the ability of the surface to be soiled.

There are largely two types of conventional methods of leveling excessive or unnecessary projections on an irregularly roughened topcoat surface. The first type is a method which involves sanding excessive projections with a sanding device after the coating is fully dried. The second type is a method involving rolling a roll made of rubber, Teflon, aluminum or stainless steel and having a smooth surface on the coated surface which is partially hardened by being left to stand for a few hours, the roll being wetted with a liquid which has an affinity with the spraying material or the coating material, i.e. the materil is soluble in the liquid. Although the former method can provide a favorable finish when the coarseness of the sanding device is carefully chosen, this method has the disadvantages that it will usually take at least half a day, or during cold weather several days, for the coatings to become hardened sufficiently for sanding, and that dust is produced during sanding so that this method is undesirable from the sanitary point of view. This method requires fairly large amounts of manual work, and skilled laborers, and frequent changing of the sanding device due to clogging of the sanding device. The latter method, on the other hand, has the advantage that handling is simple, since it involves merely rolling a roller on the coated surface, without the formation of dust. However, this method also has disadvantages, in that the time required for rolling will be dependent upon the wetting condition of the roller since the roller tends to stick or adhere to the surface, and that a large amount of the surface material may become detached from the coated mass on the surface by adhering to the roller and then be transferred to another place, thereby causing fluff projections which impair the appearance of the decorative relief finished surface. This may also lead to a decrease in workability. Particularly, this conventional method has the disadvantage that when a wide area of the wall surface is treated, the roller has to be wetted a plurality of times during the treating operation. In another case, too, in which a two-pack hardenable epoxy resinous coating material is employed, the application of this method is inappropriate because the coating composition will rapidly become completely hardened before it is possible to complete the treatment of the entire wide area of the uneven surface.

SUMMARY OF THE INVENTION

Accordingly, it is an object of the present invention to provide a relief finish surface of good decorative appearance. Another object of the present invention is to provide a method of forming a decorative relief surface having both flattened and roughened areas which have a desired decorative appearance. A further object of the present invention is to provide a method of forming the decorative surface by press-leveling or press-finishing top portions of projections on partially hardened surfaces of undercoats which extend a predetermined height with a particular pressing roller, such that the projections are uniformly flattened to a predetermined thickness and the rest of the projections are left unflattened. Other objects, features and advantages of the present invention will become apparent from the following specification, the accompanying drawings and the appended claims.

BRIEF DESCRIPTION OF THE DRAWINGS

The present invention and particularly the method of forming a decorative relief surface having both uniformly flattened and roughened areas according to the present invention will best be understood from the following description of an embodiment thereof when read in connection with the accompanying drawings, in which.

DETAILED DESCRIPTION OF THE INVENTION

Figure 1:
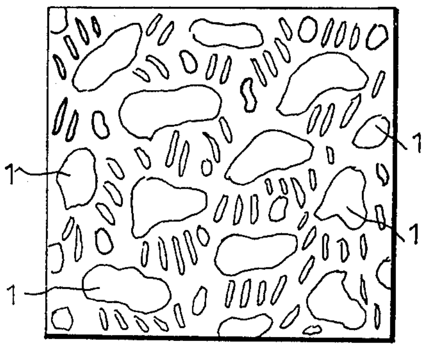
FIGS. 1 and 2 are diagrams showing illustrative embodiments of uneven, decorative relief surfaces having uniformly flattened and roughened areas obtained by the method of the present invention.
Figure 2:
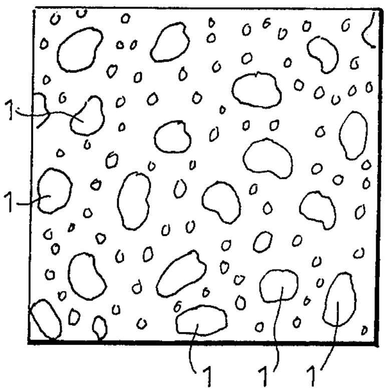
Figure 5:
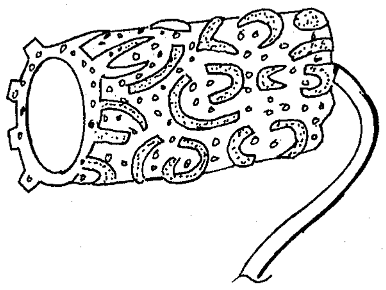
FIG. 5 is a schematic perspective view of a coating roller or a pattern-forming roll for providing an undercoat surface with a pattern.
Figure 6:
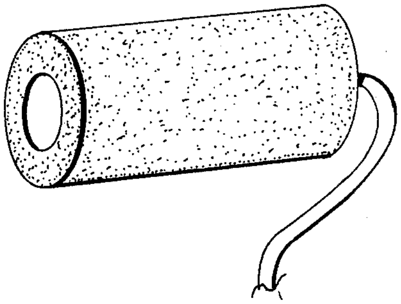
FIG. 6 is a schematic perspective view of a pressing roller to be used to level the surface of an undercoating according to the present invention.
Figure 3A:
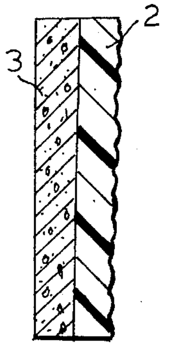
FIG. 3*a* is a sectional view depicting a layer of undercoat on an object or substrate.
Figure 3B:
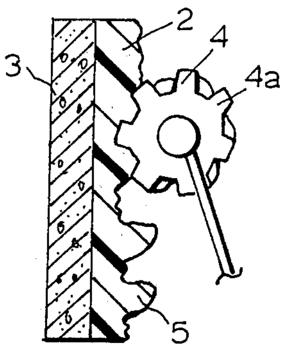
FIG. 3*b* is a sectional view showing the procedure of forming an uneven and irregularly roughened pattern on the layer of undercoat with a particular pattern-forming roller.
Figure 3C:
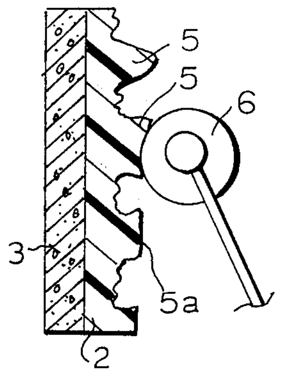
FIG. 3*c* is a sectional view depicting the procedure of flattening an uneven patterned surface with a pressing roller used for the present invention.
Figure 4A:
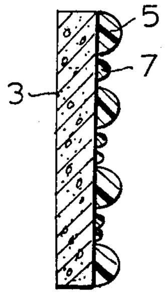
FIG. 4*a* is a sectional view illustrating the procedure of forming a different type of a coating on a substrate.
Figure 4B:
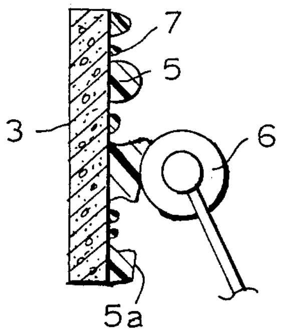
FIG. 4*b* is a sectional view showing the procedure of the present invention.

The method of the present invention will be described in more detail with reference to the accompanying drawings. Referring now to FIG. 3*a*, a layer of undercoat 2 may be applied to an object or substrate 3 with a particular spraying device such as a spray gun or by coating them with a conventional roller coater. At this end, there may also be used a pattern-forming roll 4 as shown in FIG. 3*b* in which its surface is provided with a plurality of convex bodies, generally indicated by 4*a*, which are formed in a curved manner by continued, disconnected or perforated line shapes in a random manner and with the intervals between the convex bodies being substantially equal to each other. The resulting layer 2 of undercoat is then provided on its surface with an uneven and irregularly roughened pattern having a variety of projections, generally indicated by 5, by means of a pattern-forming rolling device 4 having the opposite pattern on its surface, as shown in FIG. 3*b*. In this case, it is advantageous to carry out this procedure while the layer of undercoat remains unhardened. In FIG. 3*c*, projections 5 on the irregularly roughened surface are levelled or flattened by pressing them with a particular pressing rolling device 6 to be employed for the present invention which will be described in more detail hereinbelow. FIG. 1 shows an illustrative embodiment of a decorative relief surface having both uniformly flattened or levelled areas 5*a* and roughened areas. Another type of decorative relief patterned surface may be formed by the following procedures which are also encompassed within the scope of the present invention. Referring to FIG. 4*a*, a layer of coating is formed on a substrate 3 with a particular spraying device so as to provide on the substrate various large projections, indicated generally by 5, and various small projections, indicated generally by 7. FIG. 4*b* illustrates the procedure of flattening projections 5 beyond a predetermined height on the uneven surface to a desired thickness by means of a pressing roll 6 made up of a particular material, as described in more detail hereinbelow, to form a decorative relief finish with a patterned surface having both uniformly finished or flattened and roughened areas, indicated generally by 5*a* or by 1 as shown in FIGS. 1 and 2. FIG. 2 shows another illustration of a decorative relief finish obtained according to this method. The procedures for flattening the top portions of projections of the layer of undercoat as shown in FIGS. 3*c* and 4*b* are carried out while the layer of undercoat is partially hardened in such a sufficient manner that the projections can be flattened or levelled with the pressing rolling device of the present invention without adhering thereto.

A layer of undercoat may be formed on an object or substrate with a spraying device such as a spray gun or with a coating rolling device such as a roller coater. The object or substrate to be used for this purpose may be any material including, for example, a building material which may be used for an interior or exterior wall, column or floor and manufactured industrially and/or built in place and/or coated or sprayed in place thereon and a material for household furniture and articles such as cabinets, lockers and desks. The substrate may include a building material made up of inorganic material such as concrete, mortar, plaster, stucco, a slate plate, a calcium silicate plate, a plasterboard or a precast concrete plate; a wooden plywood such as veneer plywood, hardboards or composition boards, sound absorbents or particle boards; and a plate made up of metals such as iron, stainless steel or aluminum alloy or electrodeposited metals. The metal may be treated with a rust-preventive agent before the application of undercoat. Materials to be used as undercoat may be any material which is conventionally employed in the building art to form a thick film on the substrate. The undercoat material may be of the putty, mastic or lysinic type, such as a resinous putty, e.g. an oil-base putty, cashew nut putty, an unsaturated polyester putty, a polyurethane putty or polyvinylic putty, an organosol or a plastisol, but the material to be used for this invention should not be construed as being limited thereto. The undercoating materials may be a cementing material or a highly viscous pigment composition containing a water-base, synthetic resinous emulsion as a vehicle or a highly viscous or a slightly less then highly viscous organic coating material, a resinous putty, an organosol or a plastisol. The cementing material may be conventional cements, various plasters, stucco, clays or a mixture thereof with a water-base synthetic resious emulsion as a coagulant. The water-base synthetic resious emulsion is a water-base emulsion of acrylic resins, styrene-butadiene latex, vinyl acetate resins or epoxy resins, such as polyvinyl acetates, polyacrylates, synthetic rubbers, petroleum resins or epoxy resins. Illustrative examples of such emulsions are a highly viscous water-base emulsion coating, any water-soluble coating, a highly volatile epoxy resinous coating, an organosol, a plastisol, a synthetic resin putty, e.g., an unsaturated polyester putty or polyvinylic putty and, preferably, those that are of thixotropic properties. These materials may be of the type having properties such they become dried at ambient temperature and/or that they become thermoset.

These undercoats may be applied over a substrate in a conventional manner a plurality of times, preferably from 2 to 10 times and, more preferably, from 2 to 5 times, to give a desired thickness of the coating. For this purpose, there may be employed a conventional coating device such a rolling coater or with a conventional spraying device such as a spray gun. The size or shape of such a rolling device is not critical, and a roll can also be employed which has on its surface a plurality of convex bodies formed in a curved manner by continued, disconnected or perforated line shapes which are formed in a random manner and with the intervals between the convex bodies being substantially equal, as viewed in a developed plan. This type of roll can also be used to form an uneven and irregularly roughened pattern. These coating roll devices may be manually or electrically operative. A plurality of the electrically-operative roller may be mounted in a machine useful for this purpose. A material for these devices may be any elastic or non-elastic material such as, for example, a synthetic resinous foam or a rubbery foam, e.g., polyurethane foam, polyethylene foam, polyvinyl chloride foam, a synthetic rubber foam, e.g., neoprene rubber foam or styrene-butadiene foam, a soft polyvinyl alcohol acetal resin foam or 1,4-butadiene terephthalate resin foam or 1,4-butadiene terephthalate resin or those treated on their surfaces with a urea, melamine, benzoguanamine or phenolic resin or a neoprene rubber, or aluminum, hard plastics or an acrylonitrile-styrene copolymeric resin.

Where the coating roller or spraying device is employed to apply undercoat over a substrate, no desired pattern is generally formed thereon. In order to give the undercoat surface a desired decorative pattern, there may be employed a pattern-forming device wich is provided on its surface with a plurality of convex parts of curved continued, disconnected or perforated line shape which are formed in a random manner and with the intervals between the convex parts being substantially equal to each other and optionally determined depending upon a desired surface to be patterned and which can also be used for applying undercoat over a substrate as described in more detail in my copending U.S. patent application Ser. No. 472,460, filed May, 22, 1974, now abandoned. Where a particular type of a spraying device such as a spray gun which is designed to form a variety of ridges or projections on the substrate is employed, the resulting undercoat surface may be provided with a desired pattern so that such a patterned surface can further be press-finished for topcoats according to the present invention.

In order to level the uneven undercoat surface prepared in such a manner as described hereinabove, the surface is pressed a plurality of times, preferably from 2 to 10 times and, more preferably, from 2 to 5 times, with a particular rolling device such as a pressing roller with a flat surface in which its roll is manufactured by a particular material. This roller may also be applied a plurality of times while the undercoat is fed. This roll may be operated manually or electrically. A plurality of the electrically-operative rollers may be mounted in a machine useful for this purpose.

The material to be employed for the roll of the roller according to the present invention is a hard or semi-hard, air-permeable, porous material. By the term "semi-hard" material is meant a material which is sufficiently rigid to transform or press top portions of projections on the coated surface beyond a determined height to level them to a desired predetermined height and, that is, which is harder than the surface of undercoats which is partially dried before pressing. The materials to be used for this purpose are generally known per se in the chemical art and are employed as materials for filtering air or liquids. They include, for example, a resin of sponge base obtained by reacting polyvinyl alcohol with formaldehyde or butyl aldehyde in the presence of a pore-forming agent or materials equivalent or similar to filtering materials which are generally used in the chemical industry, a material made by immersing a cellulose ribbon in a phenolic resin and laminating it to a base (for example, "MICROPON 6R-28" registered trade mark of Fuji Filter Industry Co.), a hard, air-permeable, porous material made by forming an acrylonitrile-styrene copolymer resin (for example, "PEARLCON" registered trade mark of Daicel Ltd.) into a roller configuration, a material having continuous pores obtained by sintering polyethylene powders (for example, "CARTRIDGE FILTER P7004" registered trade mark of Kaken Chemical Co., Ltd.) or a hard, air-permeable material obtained by sintering glass beads. The rollers formed by these materials may also be treated on their surfaces with a variety of resins such as urea, benzoguanamine, melamine, phenolics or neoprene resins. Since the roller material may have resinous, continuous pore structure and an OH group in its molecule, and since it has a resinous, continuous pore structure, it is highly hydrophilic in nature and superior in resistance to damage or corrosion by the liquid discussed in the next paragraph and in water absorption and water retention properties due to its hydrophilic and capillary properties based on its finedly porous structure.

The decorative relief finish process of the present invention may be carried out in a conventional manner by means of the pressing roller, as described hereinabove. Although it is preferred to use the roller in a wet state as in conventional processes, a satisfactory effect can be achieved on a relatively narrow area of the surface without using the wet roller. In this case, of course, a favorable result can also be obtained with a wet roller. The method of making the roll wet is carried out in a conventional manner, e.g., dipping it in a tray which holds the liquid or supplying it with the liquid from the outside and/or in a continuous manner, for example, by means of a device capable of applying the liquid continuously to the surface or hollow of the roll. Accordingly, the present invention should not be construed as being limited to a procedure in which a roll is employed in the wet state. Preferably, the roller is usually wetted with a liquid having an affinity with the surface material and its illustrative examples are normally water, a thinner or any other liquids useful for this purpose so long as such liquids do not affect the quality of the roller adversely. The extent to which the roller becomes wet is such that the liquid is evenly distributed over the porous texture of the roller. If the roller is excessively wetted, excess liquid tends to dissolve the surface material of the finished surface, thereby impairing appearance of the decorative relief finished pattern. It is therefore desirable to shake the roller lightly or run it over the sloping bottom of a liquid-holding tray after dipping the roller in the liquid to remove excess liquid. It may also be possible to use the pressing roller by reducing the pressure of its inner portion.

The uneven surface to be treated is in such a partially hardened state that, at a light touch to the formed uneven surface with a finger, the material does not stick to the finger. By lightly rolling the above roller over the partially hardened surface, the excessive projections of the uneven surface can be smoothly flattened or leveled in a uniform manner. The finished surface is then dried and coated with a topcoating in a conventional manner.

When the pressing roller is applied to the uneven surface of an object or substrate to be patterned, the excessively high projections can be flattened in a conventional manner. The pressing roller may be manually or electrically operative. Where the roller is operated electrically, a plurality of rollers may be furnished therewith. The roller material to be employed in the present invention is so porous that top portions of some of the projections beyond a predetermined height are slightly scraped and at the same time are in such a condition that a slight amount of top portions of the flattened areas is dissolved or dispersed in an affinity type liquid contained in the roller. Since the liquid serves as a lubricant, the press-leveling treatment can continuously be carried out without adherence of the surface of the roller to the object surface. Thus, the treatment can be continued without exerting disadvantageous effects upon the appearance of the patterned surface until fine hollows on the surface of the roller are clogged up. This roller may absorb some portions of the excessively high projections on the irregularly roughened surface of undercoats into its porous structure, thereby functioning to avoid transferring them to another place. This function may be an advantage in comparison with that of either a rubber or Teflon or aluminium roller which has no space for the adhered material to escape. Accordingly, the method of the present invention renders it possible to effect the press-leveling treatment of the uneven patterned surface in an early stage of curing, and the leveling is more effective before the hardening proceeds too much. Where a grade of air-permeable roller material is chosen, it is possible to transfer and copy a new pattern on the surface of the roll to flattened areas. For example, the use of a porous roller having a coarse surface can produce a rough finished appearance.

When the fine hollows of the roller are clogged up, the roller may be recovered for further use by merely dipping it in a liquid having an affinity to the clogging material and lightly rinsed several times to remove the foreign clogging. As a result, the need for rinsing can readily be judged only by observing the surface of the roller and also from the feel of the load of the roller during use thereof by hand, whereby the time for rinsing can be greatly reduced and workability can be enhanced. This may also make it feasible to foresee the clogging before the condition is heavily deteriorated. The liquid used for rinsing can be continuously used unless it is heavily contaminated. When a rubber or Teflon or aluminium roller is used in a conventional manner, the rinsing treatment cannot be effected so simply, requiring for example a rinsing brush, as compared with the case where the roller of the present invention is employed.

The method of this invention can avoid the disadvantages of conventional methods, as described hereinabove. For example, the employment of the pressing roller according to the present invention can make it easy and feasible to handle the roller without the roller adhering to the surface of a substrate or without removing a large amount of the surface material from the coated surface. This can avoid the formation of fluffy projections on the surface and also prevent a coated material from being carried over to another place and being caused to adhere thereto to form an undesirable pattern on the surface. Since the method of the present invention allows the treatment of the roughened surface at an optional time before hardening, it can also be advantageously applied to an unevenly coated surface prepared from a two-pack hardenable epoxy resin system, of the type including two separately packaged materials which are mixed together on use, which has a high curing rate. Furthermore, since the work can be performed merely by rolling the pressing roller, the present invention can save a great amount of manual labor. Moreover, the use of the roller of the present invention, as compared with the method where conventional rollers are employed, has the advantage of being entirely free from dust or the like which is produced in the conventional sanding operation with a sanding device, so that the method of the invention is sanitary.

The decorative finish relief on the surface of undercoat obtained according to the present invention is then coated with a topcoating in a conventional manner to bring out better decorative appearance. The topcoating may be applied over the surface with a conventional coating device such as a spray gun. The topcoating to be used for this purpose may be any paint of the type which can generally be employed as a topcoating in this art and which can be dried at ambient or elevated temperatures, such as organic paints, inorganic paints, multi-color paints (suspension paints) or flame-retardant paints. Examples of these paints are alkyd resinous paints, nitrocellulose lacquer, acrylic lacquer, polyurethane resinous paints, epoxy resinous paints, polyester resinous paints, water-soluble resinous paints, water-base emulsion paints, lysinic paints, melamine resinous paints, acrylic resinous paints, phenolic resinous paints, polyvinyl chloride resinous paints, two-pack hardenable acrylic polyurethane resinous paints of the type including two separately packaged materials which are mixed together on use, polyurethane liquid containing compositions as described in U.S. Pat. No. 3,549,583, fluoroplastic paints or silicone paints. These paints may also be comprised of vehicles without any pigment or contain powders of metals which are conventionally employed in this art. It may also be advantageous to tone the relief with a different color, for example to apply a darker tone to the deeper areas to bring out the relief structure in a more decorative manner. For this purpose, a paint to be employed is such that its vehicle is different from that of the topcoating which is used to give a different tone to the deeper areas or its hue, brightness or shade is different from that of said other topcoat and it may be selected among those illustrated hereinabove as topcoatings, depending upon what effects are to be achieved.

The examples which follow serve to illustrate more fully the process described above, but they should not be construed as limiting the present invention thereto.

EXAMPLE 1

A 220 poise filler-containing vinyl acetate acrylic resin emulsion type coating composition was applied to the surface of a substrate with a roller having an ordinary patterned matrix to form the uneven pattern. With an air-permeable, porous, paper-molded pressing roll prepared by immersing it in a phenolic resin, an acrylonitrile-styrene copolymerized resin spheric-shaped roller, and a polyethylene powder sintered roller separately used at 23° C. 1.5 hours and 2 hours after the formation of the pattern, the surface was press-leveled by rolling thereon the roller which had previously been dipped in water and lightly drained of the water.

What is claimed is:

1. A process of making a decorative relief finish, said process comprising:

forming on the surface of an object on which a decorative relief finish is to be formed a partially hardened layer of coating material having an uneven surface with a plurality of projections of different heights;

providing a pressing roll having a surface which is made of a material which is resinous, has a continuous pore structure, is at least semi-hard, and has the properties of water absorption and water retention;

impregnating said pressing roll with a liquid which is capable of being evenly distributed through the pores of said roller material, which will not damage said roller material, and which has an affinity to said coating material; and pressing and rolling said pressing roll, while impregnated with said liquid, against the top portions of those of said projections above a predetermined height, thereby flattening said projections to said height, the remainder of said projections below said given height being left unflattened, thus forming a decorative relief finish having both flattened and roughened areas.

2. The process of claim 1 wherein the step of forming the coating layer comprises forming a layer of the coating material to a predetermined thickness and applying to said layer a plurality of times a pattern-forming roller, said pattern-forming roller having thereon convex bodies of curved continued, disconnected or perforated line shape which are positioned in a random manner and with the intervals between said convex bodies being substantially equal to one another when viewed in a developed plane view of the surface of the pattern forming roller.

3. The process of claim 2, wherein the pattern-forming roller is manually operated.

4. The process of claim 2, wherein the pattern-forming roller is electrically operated.

5. The process of claim 2, wherein the pattern-forming roller is an elastic material.

6. The process of claim 5, wherein the elastic material is a material taken from the group consisting of polyurethane foam, polyethylene foam, polyvinyl chloride foam, neoprene rubber foam, styrene-butadiene foam, soft polyvinyl alcohol acetal resin foam, 1,4-butadiene terephthalate resin foam, and 1,4-butadiene terephthalate resin.

7. The process of claim 2 wherein the pattern-forming roller is a non-elastic material.

8. The process of claim 7, wherein the non-elastic material is a material taken from the group consisting of aluminum and hard plastic.

9. The process of claim 7, wherein the non-elastic material is acrylonitrilestyrene copolymeric resin.

10. The process of claim 1 wherein the step of forming the coating layer comprises spraying said coating material with a spray gun for forming the plurality of projections of different heights.

11. The process of claim 1, wherein the coating material is a material taken from the group consisting of cementitious material and organic coating materials.

12. The process of claim 11, wherein the cementitious material is a material taken from the group consisting of cement, plaster, stucco, clay and mixtures thereof with a water-base synthetic resinous emulsion as a coagulant.

13. The process of claim 11, wherein the water-base synthetic resinous emulsion is a water-base emulsion of a material taken from the group consisting of acrylic resins, vinyl acetate resins, epoxy resins and styrene-butadiene latex.

14. The process of claim 1, wherein the surface of the object is a material selected from the group consisting of concrete, mortar, plaster, stucco, slate plate, calcium silicate plate, plasterboard, and precast concrete plate.

15. The process of claim 1, wherein the surface of the object is selected from the group consisting of veneer plywood, hardboard and composition board, sound absorbent and particle board.

16. The process of claim 1, wherein the surface of the object is a plate made of a metal selected from the group consisting of aluminum, iron and stainless steel.

17. The process of claim 1, wherein the pressing roll is operated manually.

18. The process of claim 1, wherein the pressing roll is operated electrically.

19. The process of claim 1, further comprising coating the decorative relief finish with a top-coat.

20. The process of claim 19, wherein the topcoat is a paint.

21. The process of claim 19, wherein the topcoat is a paint taken from the group consisting of organic paint and inorganic paint.

22. The process of claim 19, wherein the topcoat is a paint taken from the group consisting of organic-solvent-soluble acrylic paint and water-base acrylic emulsion paint.

23. The process of claim 19, wherein the topcoat is an acrylic polyurethane resinous paint of the type including two separately packaged materials which are mixed together on use.

24. The process of claim 19, wherein said topcoat contains a metallic powder.

25. The process of claim 19, further comprising, after said topcoat has dried, applying to the topcoat a paint having an appearance different from that of said topcoat.

26. The process of claim 25, wherein said further paint has a hue, brightness or shade different from that of said topcoat.

27. The process of claim 25, wherein said further paint contains a metallic powder.

28. The process of claim 27, wherein said paint is applied only to the flattened areas of said decorative relief finish.

29. An article having a substrate surface coated with the decorative relief finish process as claimed in claim 1.

* * * * *